United States Patent
McCarthy et al.

(10) Patent No.: US 11,168,621 B2
(45) Date of Patent: Nov. 9, 2021

(54) METHOD AND SYSTEM FOR OPERATING AN ENGINE IN A MULTI-ENGINE AIRCRAFT

(71) Applicant: PRATT & WHITNEY CANADA CORP., Longueuil (CA)

(72) Inventors: Sean McCarthy, Beaconsfield (CA); Patrick Manoukian, Saint-Laurent (CA); Zachary Mounir Faty, Montreal (CA); Carmine Lisio, Laval (CA); Philippe Beauchesne-Martel, Brossard (CA)

(73) Assignee: PRATT & WHITNEY CANADA CORP., Montreal (CA)

( * ) Notice: Subject to any disclaimer, the term of this patent is extended or adjusted under 35 U.S.C. 154(b) by 209 days.

(21) Appl. No.: 16/292,684

(22) Filed: Mar. 5, 2019

(65) Prior Publication Data
US 2020/0284206 A1 Sep. 10, 2020

(51) Int. Cl.
*F02C 9/42* (2006.01)
*B64C 27/12* (2006.01)
*F02C 6/02* (2006.01)

(52) U.S. Cl.
CPC ............... *F02C 9/42* (2013.01); *B64C 27/12* (2013.01); *F02C 6/02* (2013.01); *F05D 2220/329* (2013.01)

(58) Field of Classification Search
CPC ...... F02C 6/00; F02C 6/02; F02C 9/00; F02C 9/26; F02C 9/42; B64C 27/00; B64C 27/04; B64C 27/12; F05D 2220/00; F05D 2220/30; F05D 2220/32; F05D 2220/329
See application file for complete search history.

(56) References Cited

U.S. PATENT DOCUMENTS

| | | | |
|---|---|---|---|
| 4,137,721 A | 2/1979 | Glennon et al. | |
| 4,644,744 A | 2/1987 | Mittendorf et al. | |
| 5,046,923 A | 9/1991 | Parsons et al. | |
| 5,363,317 A | 11/1994 | Rice et al. | |
| 6,293,085 B2 * | 9/2001 | Thompson | ............ F01D 21/045 60/773 |
| 8,403,255 B2 | 3/2013 | Piasecki | |

(Continued)

FOREIGN PATENT DOCUMENTS

| | | |
|---|---|---|
| GB | 2192163 A | 1/1988 |
| JP | 4629504 B2 | 2/2011 |

OTHER PUBLICATIONS

Extended European Search Report dated Jul. 30, 2020 in connection with European Application No. 20161323.9.

*Primary Examiner* — Geepy Pe
*Assistant Examiner* — Michael Allen Brace, Jr.
(74) *Attorney, Agent, or Firm* — Norton Rose Fulbright Canada LLP (57) ABSTRACT

Systems and methods for operating an engine in a multi-engine rotorcraft are described herein. A first parameter indicative of torque of a first engine is obtained. A decrease of the first parameter is detected. In response to detecting the decrease of the first parameter, an autorotation of the rotorcraft is accommodated, A second parameter indicative of torque of a second engine of the rotorcraft is assessed while accommodating the autorotation. If the second parameter has not decreased, a shaft shear of the first engine is identified and accommodating of the autorotation is ended. If the second parameter has decreased, the accommodating is maintained.

20 Claims, 5 Drawing Sheets

(56) References Cited

U.S. PATENT DOCUMENTS

| | | |
|---|---|---|
| 8,762,024 B2 | 6/2014 | Fernandez |
| 8,943,876 B2 | 2/2015 | Rowe et al. |
| 9,045,223 B2 | 6/2015 | Connaulte et al. |
| 9,193,450 B2 | 11/2015 | Worsham, II et al. |
| 9,242,727 B1 | 1/2016 | Alvarez et al. |
| 9,387,934 B2 | 7/2016 | Gomez |
| 9,404,385 B2 | 8/2016 | Rowe |
| 9,410,444 B2 | 8/2016 | Bacic |
| 9,506,401 B2 | 11/2016 | Bacic et al. |
| 9,586,691 B2 | 3/2017 | Rossotto et al. |
| 10,047,678 B2* | 8/2018 | Certain .................. F01D 21/02 |
| 10,065,734 B2 | 9/2018 | Worsham, II et al. |
| 10,144,528 B2 | 12/2018 | Rossotto |
| 10,167,784 B2 | 1/2019 | Dooley |
| 10,180,078 B2 | 1/2019 | Roach et al. |
| 10,228,304 B2 | 3/2019 | Heyerman et al. |
| 10,228,305 B2 | 3/2019 | Shenouda |
| 10,415,422 B2* | 9/2019 | Brummel .............. F04D 27/001 |
| 10,465,554 B2* | 11/2019 | MacDonald ............ F01D 21/02 |
| 10,578,031 B2* | 3/2020 | Lescher .................... F02C 9/46 |
| 2010/0086404 A1 | 4/2010 | Thomassey et al. |
| 2010/0088003 A1* | 4/2010 | Meacham ............ F01D 21/003 701/100 |
| 2013/0098042 A1* | 4/2013 | Frealle .................. F01D 21/003 60/734 |
| 2014/0283527 A1* | 9/2014 | Ling ........................ F02C 9/42 60/793 |
| 2016/0090918 A1 | 3/2016 | Certain |
| 2016/0298486 A1* | 10/2016 | Langford .................. F02C 9/46 |
| 2017/0101938 A1 | 4/2017 | Lescher et al. |
| 2017/0205312 A1 | 7/2017 | Heyerman et al. |
| 2017/0369160 A1 | 12/2017 | White et al. |
| 2018/0045071 A1 | 2/2018 | Roach et al. |
| 2018/0051585 A1 | 2/2018 | Xiong et al. |
| 2018/0065738 A1 | 3/2018 | Lappos et al. |
| 2018/0073387 A1 | 3/2018 | Kestering |
| 2018/0163640 A1 | 6/2018 | Dubreuil et al. |
| 2018/0246510 A1* | 8/2018 | Bothwell .............. B64C 13/345 |
| 2019/0135411 A1 | 5/2019 | Gonzalez et al. |
| 2019/0154543 A1 | 5/2019 | Heyerman et al. |
| 2019/0170068 A1 | 6/2019 | Darby et al. |
| 2019/0248482 A1 | 8/2019 | Gillett |
| 2019/0292936 A1 | 9/2019 | Birch et al. |

* cited by examiner

METHOD AND SYSTEM FOR OPERATING AN ENGINE IN A MULTI-ENGINE AIRCRAFT

TECHNICAL FIELD

The present disclosure relates generally to engine control, and, more particularly, to operating an engine in a multi-engine aircraft.

BACKGROUND OF THE ART

On a rotorcraft, such as a dual-engine helicopter, there are two engines which are coupled to a gearbox to drive the rotorcraft's rotor. When the rotor spins faster than the output shafts of the engines this results in an event known as autorotation. When autorotation occurs the rotor turns without being driven by the engines, as the output shafts of the engines becomes decoupled from the rotorcraft's gearbox. When the output shafts of the engines becomes decoupled, torque on the output shafts drops to zero. Torque remains at zero until the output shafts become recoupled with the gearbox and rotates at the same speed as the rotor.

Another event that can result in torque on an output shaft dropping to zero is a shaft shear.

There is a need for improvement.

SUMMARY

In one aspect, there is provided a method for operating an engine in a multi-engine rotorcraft. The method comprises obtaining a first parameter indicative of torque of a first engine, detecting a decrease of the first parameter indicative of torque of the first engine, accommodating an autorotation in response to detecting the decrease of the first parameter, assessing a second parameter indicative of torque of a second engine of the rotorcraft while accommodating the autorotation, if the second parameter has not decreased, identifying a shaft shear of the first engine and ending the accommodating of the autorotation, and if the second parameter has decreased, maintaining the accommodating.

In one aspect, there is provided a system for operating an engine in a multi-engine rotorcraft. The system comprises at least one processing unit and a non-transitory computer-readable memory having stored thereon program instructions. The program instructions are executable by the at least one processing unit for obtaining a first parameter indicative of torque of a first engine, detecting a decrease of the first parameter indicative of torque of the first engine, accommodating an autorotation in response to detecting the decrease of the first parameter, assessing a second parameter indicative of torque of a second engine of the rotorcraft while accommodating the autorotation, if the second parameter has not decreased, identifying a shaft shear of the first engine and ending the accommodating of the autorotation, and if the second parameter has decreased, maintaining the accommodating.

In one aspect, there is provided a method for operating an engine in a multi-engine rotorcraft. The method comprises obtaining a first parameter indicative of torque of a first engine, detecting a decrease of the first parameter indicative of torque of the first engine, in response to detecting the decrease of the first parameter, accommodating an autorotation by adjusting fuel flow to the first engine to maintain a rotational speed of the first engine substantially at a rotational speed target, assessing a second parameter indicative of torque of a second engine of the rotorcraft while accommodating the autorotation, if the second parameter has not decreased, identifying a shaft shear of the first engine and ending the accommodating of the autorotation, and if the second parameter has decreased, maintaining the accommodating.

DESCRIPTION OF THE DRAWINGS

Reference is now made to the accompanying figures in which.

It will be noted that throughout the appended drawings, like features are identified by like reference numerals.

DETAILED DESCRIPTION

Figure 1:
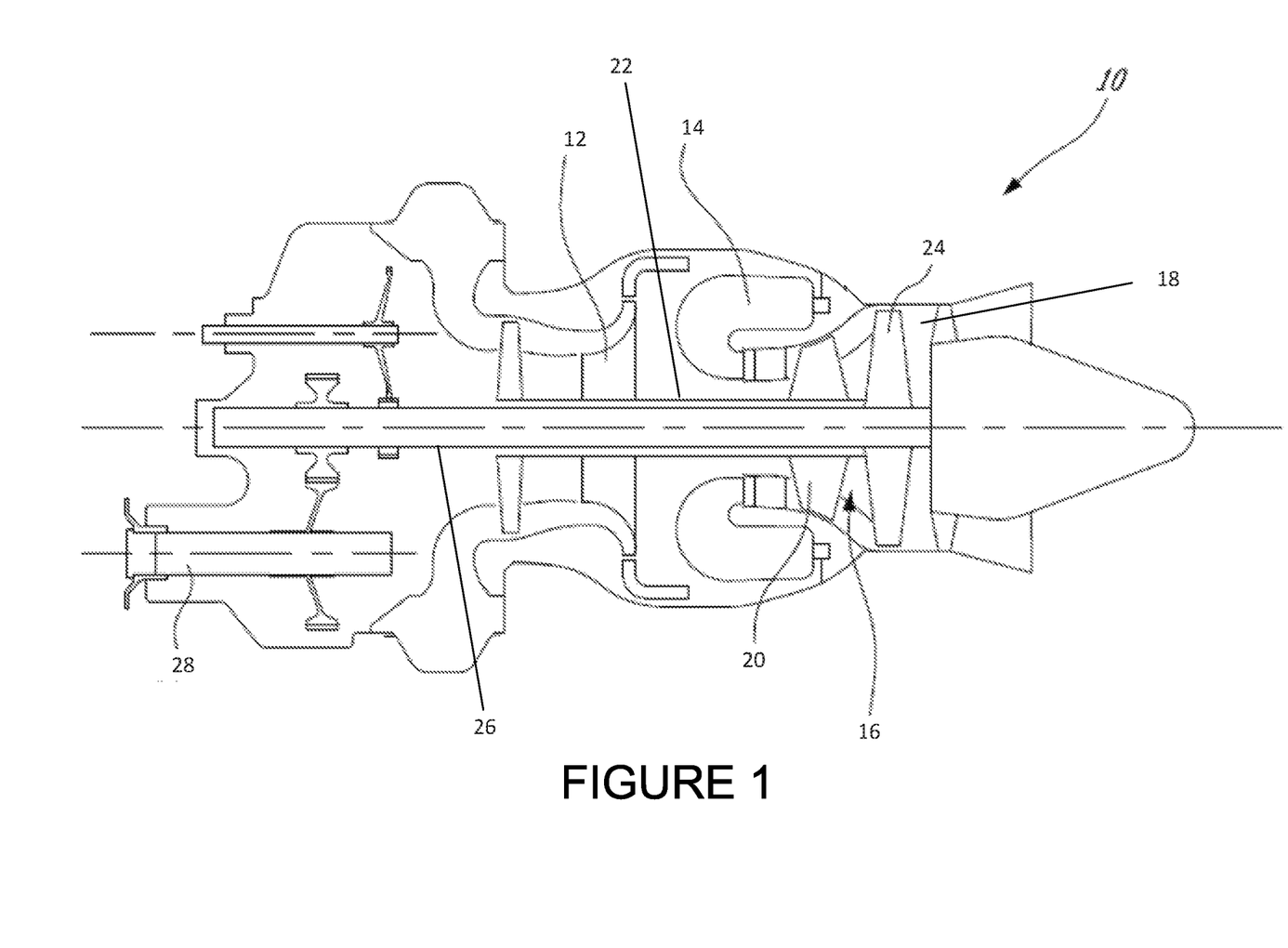
FIG. 1 is a schematic of an example gas turbine engine.

FIG. 1 illustrates a gas turbine engine 10 of a type that may be provided for use in flight, generally comprising in serial flow communication a compressor section 12 for pressurizing the air, a combustor 14 in which the compressed air is mixed with fuel and ignited for generating an annular stream of hot combustion gases, and a turbine section 16 for extracting energy from the combustion gases. The combustion gases flowing out of the combustor 14 circulate through the turbine section 16 and are expelled through an exhaust duct 18. The turbine section 16 includes a compressor turbine 20 in driving engagement with the compressor section 12 through a high pressure shaft 22, and a power turbine 24 in driving engagement with a power shaft 26. The power shaft 26 is in driving engagement with an output shaft 28 through a reduction gearbox (not illustrated).

Figure 2A:
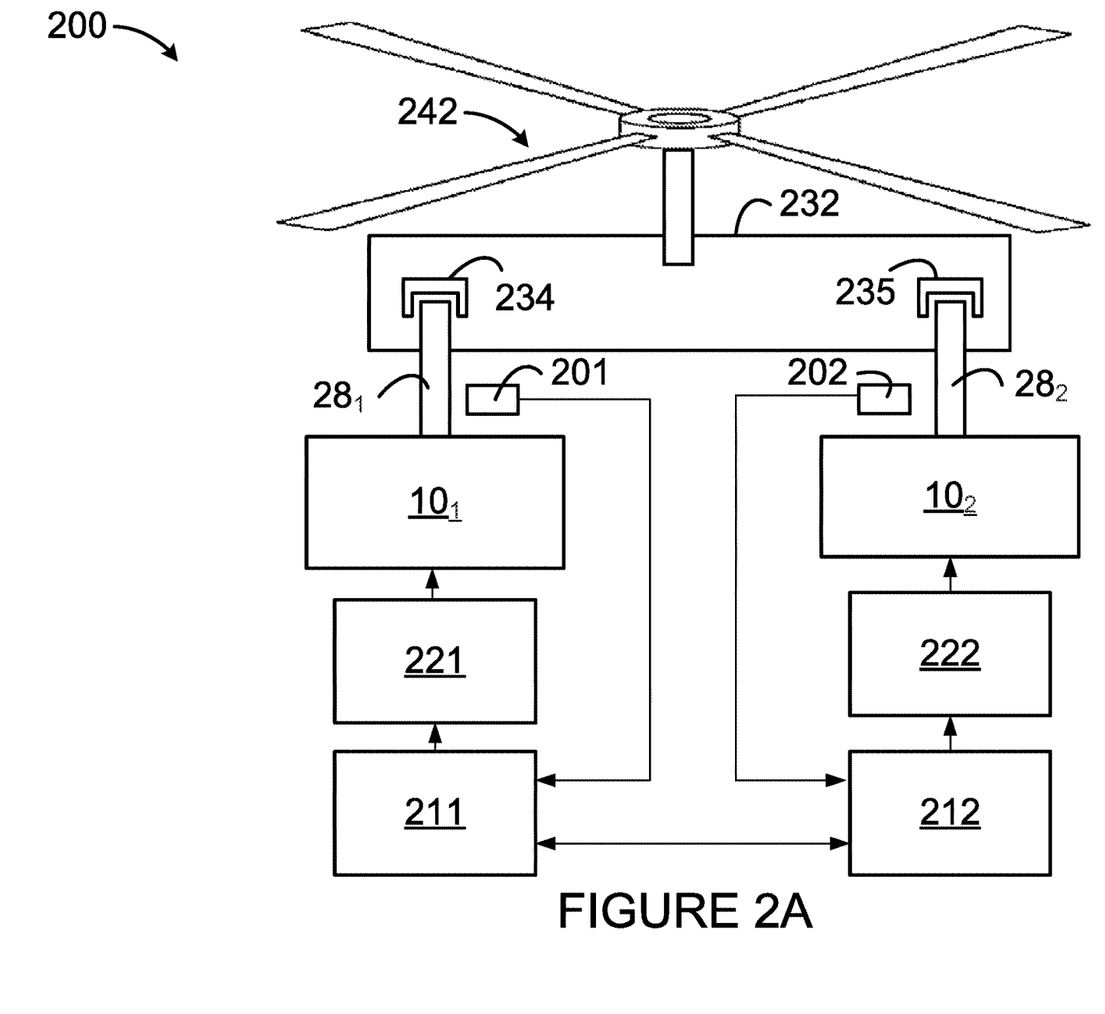
FIGS. 2A-2B are schematic diagrams illustrating example systems for controlling an engine in a multi-engine rotorcraft.

FIG. 2A illustrates a system 200 for controlling an engine in a multi-engine rotorcraft, in accordance with an embodiment. In this embodiment, a first engine $10_1$ and a second engine $10_2$ of the rotorcraft are shown. The engines $10_1$, $10_2$ are gas turbine engines, such as the engine 10. A first output shaft $28_1$ of the first engine $10_1$ and a second output shaft $28_2$ of the second engine $10_2$ are selectively coupled with a rotor 242, through an rotorcraft gearbox 232. The rotorcraft gearbox 232 combines the torque delivered by the engines $10_1$, $10_2$ to the rotor 242. Each output shaft $28_1$, $28_2$ is independently engaged or disengaged from the gearbox 232. For example, clutches 234, 235 can be used to independently engage or disengage the output shafts $28_1$, $28_2$ from the gearbox 232. That is, a given clutch (e.g., the clutch 234) is coupled to a component, such as a gear, of the gearbox 232 and can selectively couple or decouple a given output shaft (e.g., the shaft $28_1$) to/from the clutch. When one or both of the output shafts $28_1$, $28_2$ are engaged with the gearbox 232, the output shafts that are engaged with the gearbox 232 drive the rotor 242. When the output shafts $28_1$, $28_2$ are disengaged from the gearbox 232, rotation of the output shafts $28_1$, $28_2$ does not drive the rotor 242.

When the rotor 242 rotates faster than the output shafts $28_1$, $28_2$, autorotation occurs and the output shafts $28_1$, $28_2$ both become decoupled from the gearbox 232. In accordance with an embodiment, the autorotation is initiated by pilot command. For example, if the pilot commands a pitch angle of the rotor blades through a collective pitch control lever to an angle having a finer pitch, the rotor 242 begins to rotate faster due to the reduced amount of drag placed on the rotor blades. This can cause the rotor 242 to rotate faster than the output shafts $28_1$, $28_2$, causing the output shafts $28_1$, $28_2$ to become decoupled from the gearbox 232. Using the first engine $10_1$ as an example, when the first output shafts $28_1$ becomes decoupled from the gearbox 232, torque on the first output shaft $28_1$ decreases to zero and the rotational speed increases due to the loss of load. A first speed sensor 201 may be used to measure the rotational speed of the first output shaft $28_1$ and provide the rotational speed to a first engine controller 211. The first engine controller 211 determines torque of the first engine $10_1$ based on the rotational speed of the first output shaft $28_1$. The first engine controller 211 is configured to detect when there is a decrease in torque and/or an increase in rotational speed of the first engine $10_1$. In response to detecting the decrease in torque and/or the increase in rotational speed, the controller 211 assumes that autorotation of the first engine $10_1$ is occurring and accommodates for the autorotation. In accordance with an embodiment, accommodating for the autorotation comprise adjusting fuel flow to the first engine $10_1$ to maintain a rotational speed of the output shaft $28_1$ of the first engine $10_1$ substantially at a rotational speed target. The rotational speed target may be set at any suitable value. For instance, accommodating for the autorotation may comprise reducing fuel flow to the first engine $10_1$ in order to maintain the output shaft $28_1$ of the first engine $10_1$ substantially at 100 percent (%) speed. The first controller 211 communicates with a first fuel control unit 221 that adjusts the fuel flow to the first engine $10_1$ as instructed by the controller 211. Accommodating for the autorotation may comprise waiting for the rotational speed of the rotor 242 to slow down to the rotational speed of the first output shaft $28_1$ and/or increasing fuel flow to increase the rotational speed of the first output shaft $28_1$ in an attempt to meet the rotational speed of the rotor 242. As used herein, accommodating an autorotation corresponds to any response mechanism(s) and/or action(s) typically used in the context of an automatic decoupling of an engine output shaft.

A second speed sensor 202 may be used to measure the rotational speed of the second output shaft $28_2$ and provide the rotational speed to a second engine controller 212. The second engine controller 212 may function in a similar manner as the first engine controller 211 described above and communicate with a second fuel control unit 222 to adjust the fuel flow to the second engine $10_1$ in order to control the rotational speed of the second output shaft $28_2$.

In the embodiment illustrated in FIG. 2A, the first controller 211 and the second controller 212 are in communication with each other. The first controller 211 can provide the torque and/or the rotational speed of the first engine $10_1$ to the second controller 212 and the second controller 212 can provide the torque and/or the rotational speed of the second engine $10_2$ to the first controller 211. For example, when the first controller 211 detects a decrease in torque and/or an increase in rotational speed of the first engine $10_1$, the first controller 211 may request from the second controller 211 the torque and/or the rotational speed of the second engine $10_2$. The second controller 212 may request torque and/or the rotational speed of the first engine $10_1$ from the first controller 211 in a similar manner. In some embodiments, torque and/or the rotational speed of the engines $10_1$, $10_2$ are shared between the controllers 211, 212 without a given controller (e.g., controller 211) making a request from the other controller (e.g., controller 212).

Figure 2B:
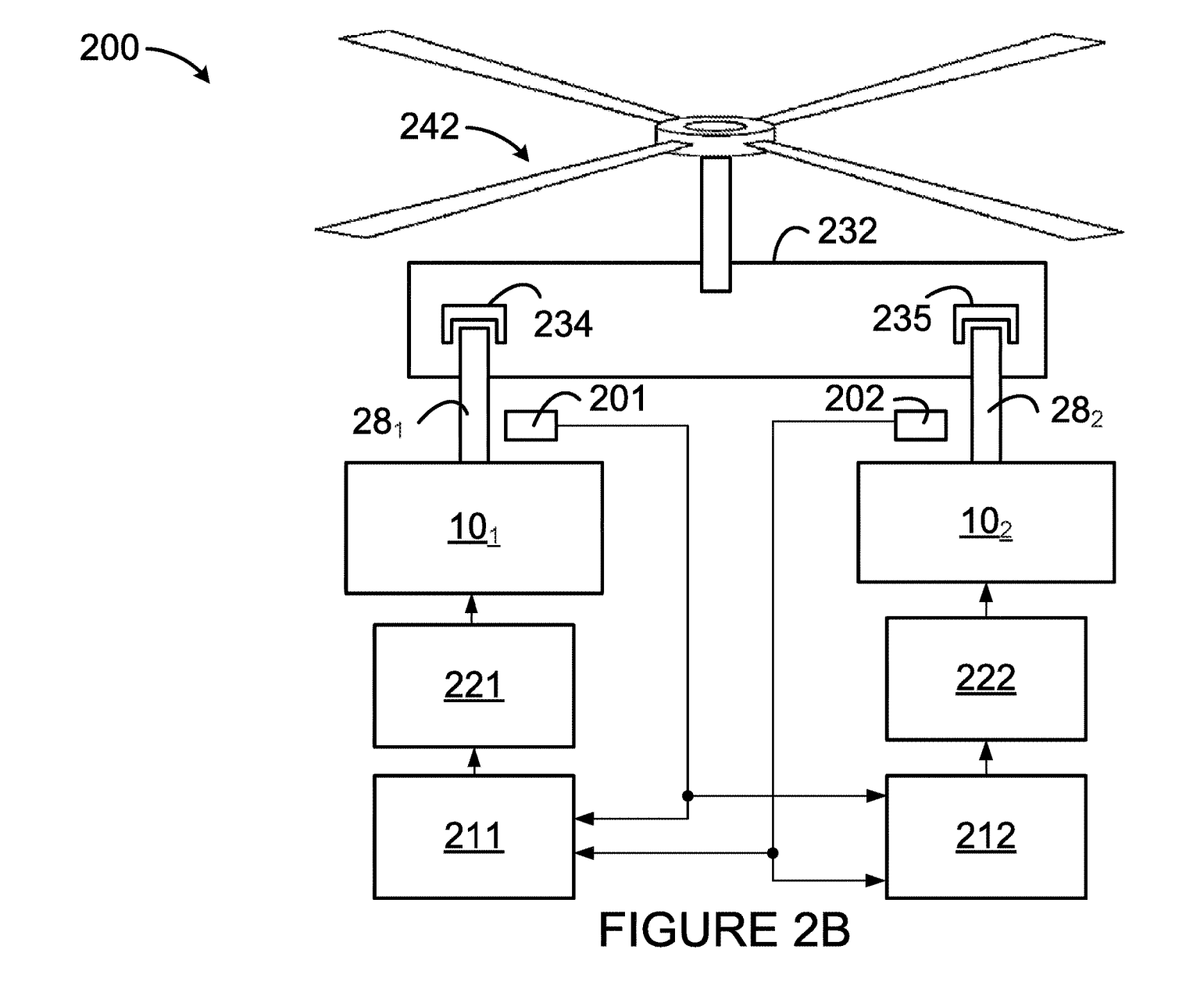

In some embodiments, as shown in FIG. 2B, each speed sensor 201, 202 is connected to both of the engine controllers 211, 212. This may be useful when, for example, the controllers 211, 212 are not in communication with each other. As shown, each sensor 201, 202 may have one output connected to both of the engine controllers 211, 212. Alternatively, each sensor 201, 202 may have two separate outputs, where one output is connected to the first controller 211 and the other output connected to the second controller 212. Accordingly, each engine controller 211, 212 is able to obtain the torque and/or the rotational speed of the first engine $10_1$ and the torque and/or the rotational speed of the second engine $10_2$.

The first controller 211 can confirm the autorotation of the first engine $10_1$ or identity a shaft shear of the first engine $10_1$ based on the torque of the engines $10_1$, $10_2$. The shaft shear may be of the output shaft $28_1$ of the first engine $10_1$ or of any other shaft (e.g., high pressure shaft 22 or the power shaft 26) of the engine $10_1$. When both engines $10_1$, $10_2$ are decreasing in torque, this is indicative an autorotation of the rotorcraft. However, when the first engine $10_1$ is decreasing in torque and the second engine $10_2$ is increasing in torque, this is indicative that a shaft shear of the first engine $10_1$ has occurred (and that the second engine $10_2$ is coupled with the rotor 242). This is because, for example, when a complete shear of the first output shaft $28_1$ occurs, this results in the torque of the first engine 10 decreasing to zero and the torque of the second engine $10_2$ increasing as the entire load of the rotor 242 is taken by the second engine $10_2$.

The controller 211 can determine whether the torque of the second engine $10_2$ has increased or decreased when the torque of the first engine $10_1$ has decreased. When the controller 211 has determined that the torque of the second engine $10_2$ has decreased, the autorotation of the first engine $10_1$ is confirmed and the accommodating of the autorotation of the first engine $10_3$ is maintained. The first controller 211 can maintain accommodating the autorotation until the first output shaft $28_1$ become re-engaged with the gearbox 232 and the first output shaft $28_1$ rotates at the same speed as the rotor 242.

When the controller 211 has determined that the torque of the second engine $10_2$ has not decreased (i.e., has increased or is the same), the controller 211 identifies a shaft shear of the first engine $10_1$ and ends the accommodating of the autorotation. In accordance with an embodiment, when the controller 211 identifies a shaft shear, the controller 211 transitions from accommodating for the autorotation to accommodation for the shaft shear. In some embodiments, when a shaft shear of the first engine $10_1$ is identified, the first controller 211 may reduce fuel flow to the first engine $10_1$. In some embodiments, when a shaft shear of the first engine $10_1$ is identified, the first controller 211 may command a shut-off of fuel to the first engine $10_1$ in order to shut-off the first engine $10_1$. The shut-off of the first engine $10_1$ may be delayed as long as the rotational speed of the first output shaft $28_1$ is maintained below an overspeed threshold. The overspeed threshold may be in the range of 120% to 130% speed, for example. Alternatively, or in combination therewith, when a shaft shear of the first engine $10_1$ is identified, the controller 211 may continue to keep the first engine $10_1$ running in order to maintain cabin bleed air and/or extractions, such as maintaining electrical generators and hydraulic pumps. The first engine $10_1$ may continue to run until it is determined that it may be shut down.

The second controller 212 may function in a similar manner to the first controller in order to confirm and maintain an autorotation of the second engine $10_2$ or to identify a shaft shear of the second engine $10_2$ and end the accommodating of the autorotation of the second engine $10_2$.

Figure 3:
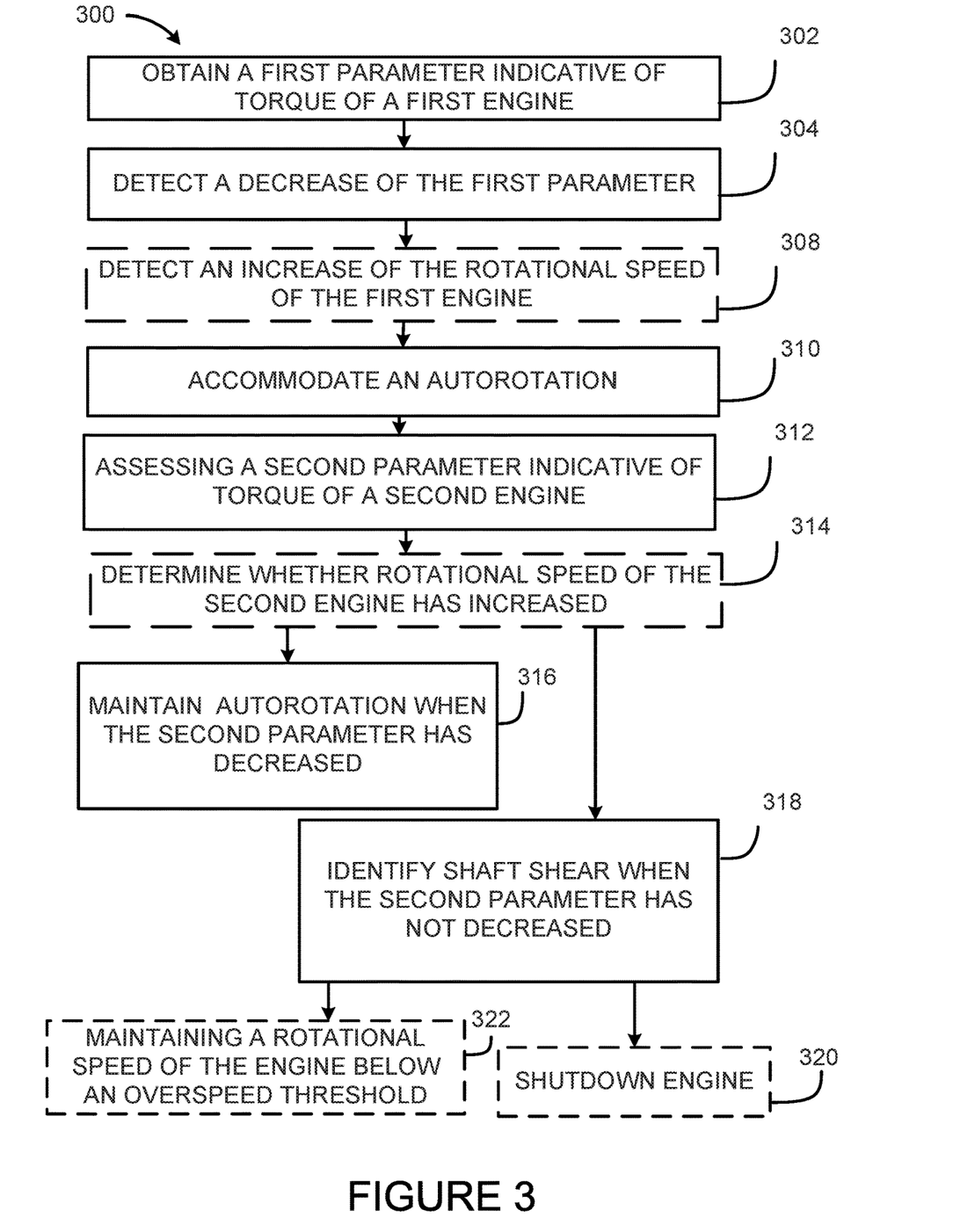
FIG. 3 is a flowchart of an example method for controlling an engine in a multi-engine rotorcraft.

With reference to FIG. 3, there is illustrated a flowchart of a method 300 for operating an engine, such as the first engine $10_1$. At step 302, a first parameter indicative of torque of the first engine $10_1$ is obtained. In some embodiments, the first parameter is the torque of the first engine $10_1$. In other embodiments, the first parameter is a rate of change of the torque of the first engine $10_1$. Obtaining the first parameter may comprise determining the first parameter based on measurements obtained from at least one sensor of the first engine $10_1$, such as the speed sensor 201. This may comprise obtaining the rotational speed of the first engine $10_1$ and determining the first parameter based on the obtained rotational speed of the first engine $10_1$. At step 304, a decrease in the first parameter is detected. In some embodiments, detecting a decrease of the first parameter comprises detecting a sudden drop of torque to 0% or close to 0%. Alternatively, a predetermined threshold may be used to compare the first parameter, whereby a decrease in the first parameter is detected when the first parameter falls below the threshold.

In some embodiments when the rotational speed of the first engine $10_1$ is obtained, the method 300 comprises detecting an increase of the rotational speed of the first engine $10_1$. The increase of the rotational speed of the first engine $10_1$ may be detected by detecting an increase in the rate of change of the rotational speed of the first engine $10_1$. The speed or rate of change of speed may be compared to a threshold and an increase may be detected when the threshold is exceeded. Note that steps 304 and 308 may be performed concurrently. Steps 302, 304, and 308 may be performed in any order, with step 304 always following step 302 and with step 308 always after step 302. In some embodiments, a first measurement (i.e. torque or speed) is obtained and the second measurement (i.e. speed or torque) is only obtained if a change in the first measurement (i.e. a decrease in torque or an increase in speed) is detected. Other scenarios are also considered.

At step 310, an autorotation of the first engine $10_1$ is accommodated. In some embodiments, step 310 is performed in response to detecting the decrease of the first parameter at step 304. In some embodiments, step 310 is performed in response to detecting an increase of the rotational speed at step 308. In some embodiments, step 310 is performed in response to detecting the decrease of the first parameter at step 304 and detecting the increase of the rotational speed at step 308. In accordance with an embodiment, accommodating for the autorotation comprise adjusting fuel flow to the first engine $10_1$ to maintain a rotational speed of the output shaft $28_1$ of the first engine $10_1$ substantially at a rotational speed target. For example, accommodating for the autorotation may comprise reducing fuel flow to the first engine $10_1$ in order to maintain the rotational speed of the first engine $10_1$ substantially at 100 percent speed. Other accommodation mechanisms known to those skilled in the art may also be used.

At step 312, the method 300 comprises assessing a second parameter indicative of torque of the second engine $10_2$ while accommodating the autorotation. In some embodiments, the second parameter is torque of the second engine $10_2$. In other embodiments, the second parameter is a rate of change of torque of the second engine $10_2$. The second parameter may be obtained from an engine computer associated with the second engine $10_2$, such as the second engine controller 212. Alternatively, the second parameter may be determined based on measurements obtained from at least one sensor of the second engine $10_2$, such as the speed sensor 202.

In some embodiments, method 300 comprises at step 314 determining whether a rotational speed of the second engine $10_2$ has increased when the rotational speed of the first engine $10_2$ has increased. At step 314, an assessment of the rotational speed of the second engine $10_2$ is made. The rotational speed of the second engine $10_2$ may be obtained from the engine computer associated with the second engine $10_2$ or may obtained from at least one sensor of the second engine $10_2$, such as the speed sensor 202. This may comprise obtaining the rotational speed of the second engine $10_2$ and determining the second parameter based on the obtained rotational speed of the second engine $10_2$. The increase of the rotational speed of the second engine $10_2$ may be detected by detecting an increase in the rate of change of the rotational speed of the second engine $10_2$.

At step 316, if the second parameter has decreased, the accommodating of the autorotation is maintained. In some embodiments, if the decrease of the second parameter is determined to have occurred and the rotational speed of the second engine $10_2$ has increased, accommodating of the autorotation is maintained.

At step 318, when the second parameter has not decreased, shaft shear of the first engine $10_1$ is identified and the method 300 ends the accommodating of the autorotation.

In some embodiments, at step 320, a shut-off of fuel to the first engine $10_1$ is commanded in response to identifying the shaft shear of the first engine $10_1$. In some embodiments, at step 322, the rotational speed of the first engine $10_1$ is maintained below an overspeed threshold in response to identifying the shaft shear of the first engine $10_1$.

The method 300 may similarly be used for operating the second engine $10_2$ such that both the engines $10_1$, $10_2$ operate according to the method 300.

It should be appreciated that as both a shaft shear and an autorotation can result in torque on an output shaft dropping to zero that the systems and/or methods described herein may be used to avoid mistakenly identifying an autorotation as a shaft shear, or vise versa. In other words, the systems and/or methods described herein may be used to detect either a shaft shear of one of the engines $10_1$, $10_2$ or an autorotation of the rotorcraft, in order to distinguish between shaft shear and autorotation events.

Figure 4:
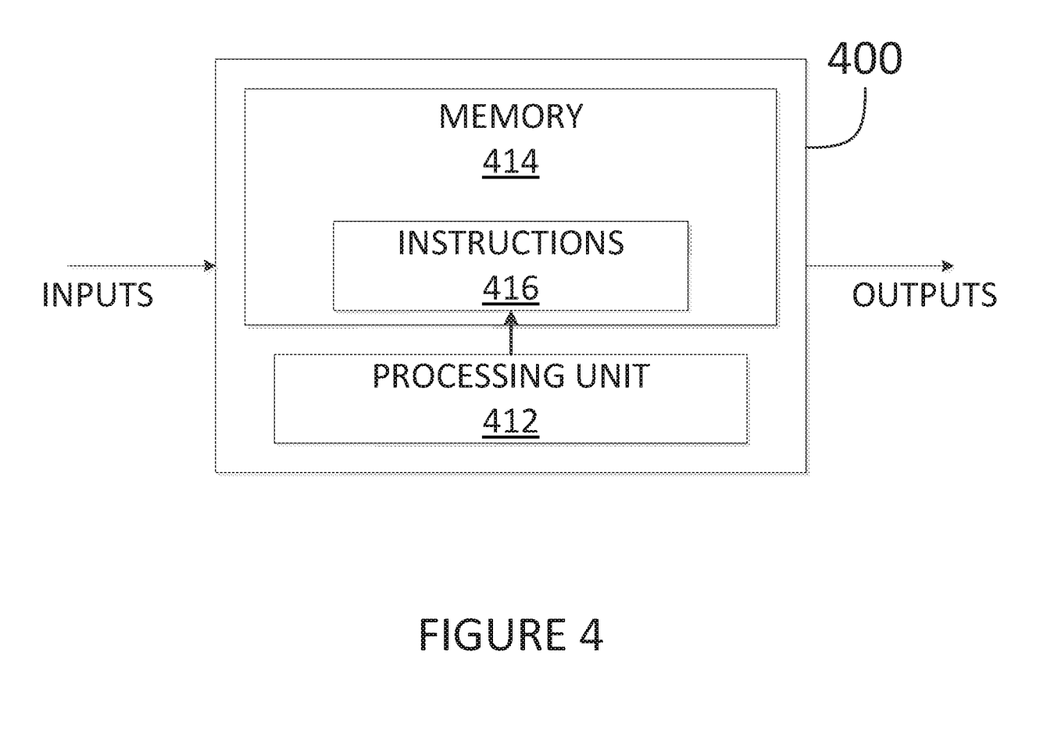
FIG. 4 is a block diagram of an example computing device for controlling an engine.

With reference to FIG. 4, an example of a computing device 400 is illustrated. The system 200 may be implemented with one or more computing devices 400, For example, each of the controllers 211, 212 may be implemented by a separate computing device 400. Similarly, the method 300 may be implemented with the computing device 400. The computing device 400 comprises a processing unit 412 and a memory 414 which has stored therein computer-executable instructions 416. The processing unit 412 may comprise any suitable devices configured to implement the method 300 such that instructions 416, when executed by the computing device 400 or other programmable apparatus, may cause the functions/acts/steps performed as part of the method 300 as described herein to be executed. The processing unit 412 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 414 may comprise any suitable known or other machine-readable storage medium. The memory 414 may comprise non-transitory computer readable storage medium, for example, but not limited to, an electronic, magnetic, optical, electromagnetic, infrared, or semiconductor system, apparatus, or device, or any suitable combination of the foregoing. The memory 414 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 414 may comprise any storage means (e.g., devices) suitable for retrievably storing machine-readable instructions 416 executable by processing unit 412, Note that the computing device 400 can be implemented as part of a full-authority digital engine controls (FADEC) or other similar device, including electronic engine control (EEC), engine control unit (ECU), electronic propeller control, propeller control unit, and the like.

The methods and systems for operating an engine described herein may be implemented in a high level procedural or object oriented programming or scripting language, or a combination thereof, to communicate with or assist in the operation of a computer system, for example the computing device 400. Alternatively, the methods and systems for operating an engine may be implemented in assembly or machine language. The language may be a compiled or interpreted language. Program code for implementing the methods and systems for operating an engine may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for operating an engine may also be considered to be implemented by way of a non-transitory computer-readable storage medium having a computer program stored thereon. The computer program may comprise computer-readable instructions which cause a computer, or more specifically the processing unit 412 of the computing device 400, to operate in a specific and predefined manner to perform the functions described herein, for example those described in the method 300.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems for operating an engine may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

What is claimed is:

1. A method for operating an engine in a multi-engine rotorcraft, the method comprising:
   obtaining a first parameter indicative of torque of a first engine;
   detecting a decrease of the first parameter indicative of torque of the first engine;
   initially accommodating an autorotation of the first engine in response to detecting the decrease of the first parameter and maintaining a rotational speed of the first engine below an overspeed threshold;
   concurrently with accommodating the autorotation of the first engine, assessing a second parameter indicative of torque of a second engine of the rotorcraft to distinguish between the autorotation and a shaft shear of the first engine;
   when the second parameter has not decreased, identifying a shaft shear of the first engine and transitioning from the accommodating of the autorotation to an accommodating of the shaft shear of the first engine; and
   when the second parameter has decreased, maintaining the accommodating of the autorotation of the first engine.

2. The method of claim 1, wherein the first parameter is torque of the first engine and the second parameter is torque of the second engine.

3. The method of claim 1, wherein the first parameter is a rate of change of the torque of the first engine and the second parameter is a rate of change of the torque of the second engine.

4. The method of claim 2, further comprising detecting an increase of a rotational speed of the first engine, and wherein the autorotation is accommodated in response to detecting the decrease of the first parameter and the increase in the rotational speed.

5. The method of claim 4, further comprising assessing a rotational speed of the second engine, and wherein the accommodating is maintained when the second parameter has decreased and the rotational speed of the second engine has increased.

6. The method of claim 1, wherein accommodating the shaft shear of the first engine comprises commanding a shut-off of fuel to the first engine.

7. The method of claim 1, wherein maintaining the rotational speed of the first engine below the overspeed threshold comprises reducing fuel flow to the first engine.

8. The method of claim 1, wherein accommodating the autorotation comprises reducing fuel flow to the first engine and maintaining a rotational speed of the first engine to a rotational speed target.

9. The method of claim 1, further comprising obtaining the second parameter from an engine computer associated with the second engine.

10. The method of claim 1, further comprising determining the second parameter based on measurements obtained from at least one sensor of the second engine.

11. A system for operating an engine in a multi-engine rotorcraft, the system comprising:
- at least one processing unit; and
- at least one non-transitory computer-readable memory having stored thereon program instructions executable by the at least one processing unit, which when executed, cause the processing unit to:
  - obtain a first parameter indicative of torque of a first engine;
  - detect a decrease of the first parameter indicative of torque of the first engine;
  - initially accommodate an autorotation of the first engine in response to detecting the decrease of the first parameter and maintain a rotational speed of the first engine below an overspeed threshold;
  - concurrent, with accommodating the autorotation of the first engine, assess a second parameter indicative of torque of a second engine of the rotorcraft to distinguish between the autorotation and a shaft shear of the first engine;
  - when the second parameter has not decreased, identify a shaft shear of the first engine and transition from the accommodating of the autorotation to an accommodating of the shaft shear of the first engine; and
  - when the second parameter has decreased, maintain the accommodating of the autorotation of the first engine.

12. The system of claim 11, wherein the first parameter is torque of the first engine and the second parameter is torque of the second engine.

13. The system of claim 11, wherein the first parameter is a rate of change of the torque of the first engine and the second parameter is a rate of change of the torque of the second engine.

14. The system of claim 12, wherein the program instructions are further executable by the at least one processing unit to detect an increase of a rotational speed of the first engine, and wherein the autorotation is accommodated in response to detecting the decrease of the first parameter and the increase in the rotational speed.

15. The system of claim 14, wherein the program instructions are further executable by the at least one processing unit to assess a rotational speed of the second engine, and wherein the accommodating is maintained when the second parameter has decreased and the rotational speed of the second engine has increased.

16. The system of claim 11, wherein accommodating the shaft shear of the first engine comprises commanding a shut-off of fuel to the first engine in response to identifying the shaft shear of the first engine.

17. The system of claim 11, wherein maintaining the rotational speed of the first engine below the overspeed threshold in response to identifying the shaft shear of the first engine comprises reducing fuel flow to the first engine.

18. The system of claim 11, wherein accommodating the autorotation comprises reducing fuel flow to the first engine and maintaining a rotational speed of the first engine to a rotational speed target.

19. The system of claim 11, wherein the program instructions are further executable by the at least one processing unit to obtain the second parameter from an engine computer associated with the second engine.

20. A method for operating an engine in a multi-engine rotorcraft, the method comprising:
- obtaining a first parameter indicative of torque of a first engine;
- detecting a decrease of the first parameter indicative of torque of the first engine;
- in response to detecting the decrease of the first parameter, initially accommodating an autorotation of the first engine by adjusting fuel flow to the first engine to maintain a rotational speed of the first engine substantially at a rotational speed target;
- concurrently with accommodating the autorotation of the first engine, assessing a second parameter indicative of torque of a second engine of the rotorcraft to distinguish between the autorotation and a shaft shear of the first engine;
- when the second parameter has not decreased, identifying a shaft shear of the first engine and transitioning from the accommodating of the autorotation to an accommodating of the shaft shear of the first engine; and
- when the second parameter has decreased, maintaining the accommodating of the autorotation of the first engine.

* * * * *